(12) United States Patent
Azuma et al.

(10) Patent No.: US 10,436,069 B2
(45) Date of Patent: Oct. 8, 2019

(54) SHEET METAL TURBINE HOUSING WITH BIAXIAL VOLUTE CONFIGURATION

(71) Applicant: HONEYWELL INTERNATIONAL INC., Morris Plains, NJ (US)

(72) Inventors: Katsumi Azuma, Saitama (JP); Kouichirou Ishihara, Tochigi (JP)

(73) Assignee: GARRETT TRANSPORTATION I INC., Torrance, CA (US)

( * ) Notice: Subject to any disclaimer, the term of this patent is extended or adjusted under 35 U.S.C. 154(b) by 341 days.

(21) Appl. No.: 15/419,381

(22) Filed: Jan. 30, 2017

(65) Prior Publication Data

US 2018/0216490 A1 Aug. 2, 2018

(51) Int. Cl.
F01D 25/24 (2006.01)
F02B 37/18 (2006.01)
(Continued)

(52) U.S. Cl.
CPC .............. *F01D 25/24* (2013.01); *F01D 9/026* (2013.01); *F01D 9/04* (2013.01); *F01D 17/105* (2013.01); *F01D 25/005* (2013.01); *F01D 25/04* (2013.01); *F02B 37/004* (2013.01); *F02B 37/18* (2013.01); *F01D 5/043* (2013.01); *F02B 33/40* (2013.01);
(Continued)

(58) Field of Classification Search
CPC ........ F01D 17/105; F01D 9/026; F01D 25/24; F01D 25/04; F01D 9/04; F02C 6/12; F02C 9/18; F02B 37/18; F02B 33/40; F05D 2220/40; F05D 2230/54
See application file for complete search history.

(56) References Cited

U.S. PATENT DOCUMENTS 5,501,075 A 3/1996 Spies et al.
5,934,070 A 8/1999 Lagelstorfer
(Continued)

FOREIGN PATENT DOCUMENTS

DE 29909018 U1 5/1999
DE 10022052 A1 3/2001
(Continued)

OTHER PUBLICATIONS

United States Patent and Trademark Office, Non-final Office Action for U.S. Appl. No. 15/419,472, dated Jan. 18, 2019.
(Continued)

*Primary Examiner* — Nathaniel E Wiehe
*Assistant Examiner* — Andrew J Marien
(74) *Attorney, Agent, or Firm* — Lorenz & Kopf, LLP

(57) ABSTRACT

Turbine housing assemblies and related turbocharger systems are provided. One exemplary turbine housing assembly includes and inner shell and an outer shell. The inner shell includes an inner base portion defining an inlet and a volute portion defining an outer contour of a volute in fluid communication with the inlet. The outer shell circumscribing the volute portion in a radial plane and includes an outer base portion circumscribing the inner base portion. The inner shell includes a first plurality of sheet metal structures joined to one another in the radial plane, the outer shell includes a second plurality of sheet metal structures, and first portions of the second plurality of sheet metal structures surrounding the volute portion are joined to one another in an axial plane transverse to the radial plane.

19 Claims, 9 Drawing Sheets

(51) Int. Cl.
    *F01D 25/00*    (2006.01)
    *F02B 37/00*    (2006.01)
    *F01D 9/02*     (2006.01)
    *F01D 9/04*     (2006.01)
    *F01D 17/10*    (2006.01)
    *F01D 25/04*    (2006.01)
    *F01D 5/04*     (2006.01)
    *F02B 33/40*    (2006.01)

(52) U.S. Cl.
    CPC ...... *F05D 2220/40* (2013.01); *F05D 2230/54* (2013.01); *F05D 2300/10* (2013.01); *Y02T 10/144* (2013.01)

(56) References Cited

U.S. PATENT DOCUMENTS

| | | | |
|---|---|---|---|
| 6,553,762 | B2 | 4/2003 | Loffler et al. |
| 6,682,321 | B1 | 1/2004 | Mukherjee et al. |
| 6,951,450 | B1 | 10/2005 | Figura et al. |
| 7,198,459 | B2 | 4/2007 | Grussmann et al. |
| 7,234,302 | B2 | 6/2007 | Korner |
| 7,371,047 | B2 | 5/2008 | Burmester et al. |
| 8,628,296 | B2 * | 1/2014 | Grussmann ........... F01D 25/243 415/204 |
| 9,097,181 | B2 * | 8/2015 | Grussmann ........... F01D 25/243 |
| 9,121,281 | B2 | 9/2015 | Sadamitsu et al. |
| 9,194,292 | B2 | 11/2015 | Yokoyama et al. |
| 9,234,459 | B2 * | 1/2016 | Sadamitsu ............ F01D 9/026 |
| 9,255,485 | B2 * | 2/2016 | Watanabe ............. F01D 9/026 |
| 9,261,109 | B2 * | 2/2016 | Maeda .................. F01D 9/026 |
| 2005/0019158 | A1 | 1/2005 | Claus et al. |
| 2005/0126163 | A1 | 6/2005 | Bjornsson, Sr. |
| 2006/0133931 | A1 | 6/2006 | Burmester et al. |
| 2007/0113550 | A1 * | 5/2007 | Sausee ................. F01D 9/026 60/598 |
| 2011/0016859 | A1 | 1/2011 | Schumnig |
| 2011/0286837 | A1 * | 11/2011 | Smatloch ............ F01D 25/243 415/170.1 |
| 2012/0288364 | A1 * | 11/2012 | Sadamitsu et al. ..... F01D 9/026 415/204 |
| 2012/0304952 | A1 | 12/2012 | Perrin et al. |
| 2013/0108414 | A1 | 5/2013 | Maeda et al. |
| 2013/0156567 | A1 * | 6/2013 | Nagae .................. F01D 25/24 415/205 |
| 2014/0238336 | A1 | 8/2014 | McMullen |
| 2015/0044034 | A1 * | 2/2015 | Jinnai .................. F01D 9/026 415/151 |
| 2015/0086347 | A1 * | 3/2015 | Jinnai .................. F01D 9/026 415/204 |
| 2018/0003306 | A1 | 1/2018 | Bonanno |
| 2018/0066541 | A1 * | 3/2018 | Hara ..................... B23K 9/00 |
| 2018/0216490 | A1 | 8/2018 | Azuma et al. |
| 2018/0216492 | A1 * | 8/2018 | Azuma .................. F01D 15/08 |
| 2018/0328226 | A1 * | 11/2018 | Yokoshima ............ F01D 9/026 |

FOREIGN PATENT DOCUMENTS

| | | |
|---|---|---|
| DE | 10218436 C1 | 8/2003 |
| DE | 102009042260 A1 | 4/2011 |
| DE | 102012110707 A1 | 5/2014 |
| DE | 112011105790 T5 | 8/2014 |
| DE | 102004039477 B4 | 1/2015 |
| DE | 102009025054 B4 | 12/2015 |
| DE | 102009042260 B4 | 12/2015 |
| EP | 1500788 A1 | 1/2005 |
| EP | 1541826 A1 | 6/2005 |
| EP | 1450017 B8 | 6/2006 |
| EP | 1303683 B1 | 7/2008 |
| EP | 2180163 B1 | 6/2013 |
| EP | 1426557 B1 | 7/2013 |
| EP | 2832886 A1 | 2/2015 |
| EP | 1631736 B1 | 7/2015 |
| FR | 2795769 A1 | 1/2001 |
| JP | 2002004871 A | 1/2002 |
| JP | 2002054117 A | 2/2002 |
| JP | 2002349276 A | 12/2002 |
| JP | 2003293779 A | 10/2003 |
| JP | 2003293780 A | 10/2003 |
| JP | 2006161573 A | 6/2006 |
| JP | 2006161579 A | 6/2006 |
| JP | 2008069664 A | 3/2008 |
| JP | 2010168969 A | 8/2010 |
| JP | 2016031027 A | 3/2016 |
| WO | 0194754 A1 | 12/2001 |
| WO | 2004109062 A1 | 12/2004 |
| WO | 2009114568 A2 | 9/2009 |
| WO | 2015185408 A1 | 12/2015 |
| WO | 2016/139799 A1 | 9/2016 |
| WO | 2016152586 A1 | 9/2016 |
| WO | 2017/078088 A1 | 5/2017 |

OTHER PUBLICATIONS

United States Patent and Trademark Office, Non-final Office Action for U.S. Appl. No. 15/419,429, dated Feb. 8, 2019.
United States Patent and Trademark Office, Non-final Office Action for U.S. Appl. No. 15/419,320, dated Feb. 19, 2019.
Extended EP Search Report for Application No. 18153909.9 dated Sep. 19, 2018.
Extended EP Search Report for Application No. 18153963.6 dated Sep. 19, 2018.
Extended EP Search Report for Application No. 18153969.3 dated Jul. 3, 2018.
Extended EP Search Report for Application No. 18153929.7 dated Jul. 3, 2018.

* cited by examiner

SHEET METAL TURBINE HOUSING WITH BIAXIAL VOLUTE CONFIGURATION

CROSS-REFERENCE TO RELATED APPLICATIONS

The subject matter described here is related to the subject matter described in U.S. patent application Ser. No. 15/419,320, U.S. patent application Ser. No. 15/419,429, and U.S. patent application Ser. No. 15/419,472, all filed concurrently herewith.

TECHNICAL FIELD

The subject matter described herein relates generally to flow control systems, and more particularly, to turbine housings for use in turbocharger systems.

BACKGROUND

Turbocharger systems are frequently used to improve the efficiency of internal combustion engines. Two-stage turbocharger systems can be used to further improve the engine efficiency over a single-stage turbocharger system including a single turbine and a single compressor. While use of two-stage turbocharger systems may be desirable in automotive vehicles, for example, to achieve fuel economy targets or other environmental goals, the combination of the added financial cost in conjunction with the size, packaging, assembly, or installation constraints may be prohibitive. Additionally, introducing turbines into the exhaust gas flow can reduce the temperature of the exhaust gas and may reduce the effectiveness of downstream emissions control devices, such as a catalytic converter. Accordingly, it is desirable to provide a turbine housing having lower thermal inertia while also achieving other performance objectives and maintaining structural integrity.

BRIEF SUMMARY

Turbine assemblies and related turbocharger systems having direct turbine interfaces are provided. An exemplary turbine assembly includes a bypass valve assembly structure including a guide portion, an inner sheet metal shell including an inner inlet portion and a volute portion providing an outer contour of a volute, wherein an end of the inner inlet portion is surrounded by the guide portion and spaced apart from the bypass valve assembly structure, and an outer sheet metal shell radially surrounding at least a portion of the volute portion and including an outer inlet portion surrounding the inner inlet portion and contacting the guide portion of the bypass valve assembly.

In another embodiment, turbine housing assembly includes a cast metal structure having an inlet opening and a bypass opening transverse to the inlet opening, an inner sheet metal shell including an inner base portion having an end disposed within the inlet opening and a volute portion that defines an outer contour of a volute, and an outer sheet metal shell that surrounds the volute portion and includes an outer base portion that circumscribes the inner base portion, wherein the outer base portion is joined to the cast metal structure and the end of the inner base portion is freestanding with respect to the cast metal structure.

In yet another embodiment, a turbine housing assembly includes a cast bypass valve assembly structure including a guide portion about an inlet opening and a bypass opening transverse to the inlet opening, an inner sheet metal shell including an inner inlet portion and a volute portion that defines an outer contour of a volute, wherein an end of the inner inlet portion is disposed within the inlet opening and surrounded by the guide portion, and an outer sheet metal shell that surrounds the volute portion and includes an outer inlet portion circumscribing the inner inlet portion and contacting the guide portion of the bypass valve assembly, wherein the outer inlet portion is joined to the cast bypass valve assembly structure and the end of the inner inlet portion is freestanding with respect to the cast bypass valve assembly structure.

Another embodiment of a turbine housing assembly includes an inner shell having an inner base portion defining an inlet and a volute portion defining an outer contour of a volute in fluid communication with the inlet. The turbine housing assembly also includes an outer shell circumscribing the volute portion in a radial plane and including an outer base portion circumscribing the inner base portion, wherein the inner shell comprises a first plurality of sheet metal structures joined to one another in the radial plane, the outer shell comprises a second plurality of sheet metal structures, and first portions of the second plurality of sheet metal structures surrounding the volute portion are joined to one another in an axial plane transverse to the radial plane.

In another embodiment, a turbine housing assembly includes an inner shell comprising a first plurality of sheet metal structures joined to one another at a first seam in a radial plane and an outer shell comprising a second plurality of sheet metal structures joined to one another at a second seam in an axial plane transverse to the radial plane. The inner shell includes a volute portion defining an outer contour of a volute in the radial plane, the outer shell substantially surrounds the volute portion and encloses the volute portion in an axial direction, and an outer base portion of the outer shell circumscribes an inner base portion of the inner shell that defines an inlet in fluid communication with the volute.

In yet another embodiment, a turbine housing assembly includes an inner sheet metal shell comprising a first pair of sheet metal structures coupled together along a radial plane orthogonal to a turbine wheel rotational axis and an outer sheet shell comprising a second pair of sheet metal structures coupled together along a first plane transverse to the radial plane. Each of the first pair of sheet metal structures includes a volute portion defining an outer contour of a volute in the radial plane and a base portion defining an inlet in fluid communication with the volute, and each of the second pair of sheet metal structures includes an arcuate portion radially overlapping at least a portion of the volute portions in the radial plane and an outer base portion radially overlapping at least a portion of the base portions in a second plane transverse to the radial plane.

Another embodiment of a turbine housing assembly includes an inner shell defining an inner inlet portion and a volute portion providing an outer contour of a volute, the inner shell comprising a first plurality of sheet metal structures coupled together in a first plane, an outer shell surrounding the volute portion and defining an outer inlet portion circumscribing the inner inlet portion, the outer shell comprising a second plurality of sheet metal structures coupled together in a second plane transverse to the first plane, and one or more energy absorbing members coupled to an inner surface of the outer shell between the outer shell and the inner shell.

In another embodiment, a turbine housing assembly includes an inner shell comprising a first pair of sheet metal structures joined to one another at a first joint in a radial plane, an outer shell comprising a second pair of sheet metal structures joined to one another about the inner shell at a second joint in an axial plane transverse to the radial plane, the second pair of sheet metal surfaces each having an inner surface, and a pair of energy absorbing members on a respective one of the inner surfaces of the second pair of sheet metal structures, wherein the pair of energy absorbing members are disposed proximate an interface between the second pair of sheet metal structures.

In yet another embodiment, a turbine housing assembly includes a thinner inner sheet metal shell comprising a first pair of sheet metal structures interfacing and joined to one another in a radial plane orthogonal to a turbine wheel rotational axis, and a thicker outer sheet shell comprising a second pair of sheet metal structures interfacing and joined to one another in a first plane transverse to the radial plane, and a third pair of arcuate sheet metal structures, wherein each of the first pair of sheet metal structures includes a volute portion defining an outer contour of a volute in the radial plane and a base portion defining an inlet in fluid communication with the volute, each of the second pair of sheet metal structures includes an arcuate portion radially overlapping at least a portion of the volute portions in the radial plane and an outer base portion radially overlapping at least a portion of the base portions in a second plane transverse to the radial plane, and each of the arcuate sheet metal structures is disposed between the volute portions of the first pair of sheet metal structures and the arcuate portion of a respective sheet metal structure of the second pair of sheet metal structures.

Another embodiment of a turbine housing assembly includes a core structure having a voided inner region defining an axial outlet and an outer surface defining an inner contour of a volute, an inner sheet metal shell comprising an inner base portion defining an inlet in fluid communication with the volute and a volute portion defining an outer contour of the volute, wherein at least a portion of the core structure defining the axial outlet extends in an axial direction through an opening in the inner sheet metal shell defined by the volute portion, and an outer sheet metal shell surrounding the volute portion and including an outer base portion circumscribing the inner base portion.

In another embodiment, a turbine housing assembly includes an inner sheet metal shell comprising a first pair of sheet metal structures joined to one another in a radial plane orthogonal to a turbine wheel rotational axis, wherein each of the first pair of sheet metal structures includes a volute portion defining an outer contour of a volute in the radial plane and an opening for an axial outlet and a base portion defining an inlet in fluid communication with the volute. The turbine housing assembly also includes a core structure disposed within the opening, the core structure having a voided inner region defining the axial outlet and an outer surface defining an inner contour of the volute, and an outer sheet metal shell comprising a second pair of sheet metal structures joined to one another about the inner sheet metal shell in a first plane transverse to the radial plane.

In yet another embodiment, a turbine housing assembly includes a cast bypass valve assembly structure including a guide portion about an inlet opening and a bypass opening oblique to the inlet opening, an inner sheet metal shell including an inner inlet portion and a volute portion defining an outer contour of a volute, wherein an end of the inner inlet portion is disposed within the inlet opening and received by the guide portion, a cast core structure disposed within an opening defined by the volute portion of the inner sheet metal shell, the core structure having a surface defining an inner contour of the volute, and an outer sheet metal shell surrounding the volute portion and including an outer inlet portion circumscribing the inner inlet portion and contacting the guide portion of the bypass valve assembly structure, wherein the outer inlet portion is joined to the cast bypass valve assembly structure and the end of the inner inlet portion is freestanding with respect to the cast bypass valve assembly structure.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
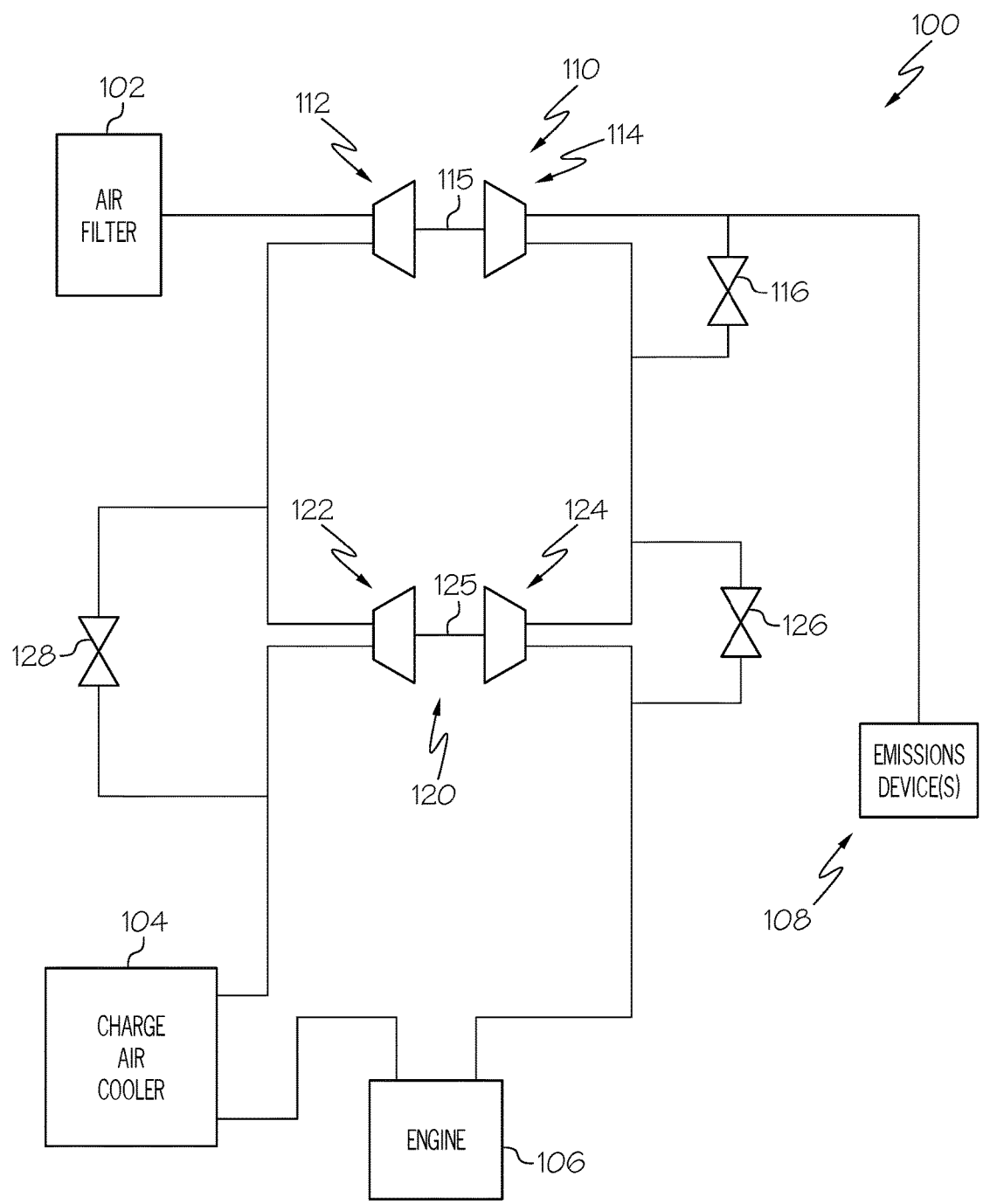
FIG. 1 is a schematic illustration of a two-stage turbocharger system in one or more exemplary embodiments.

Embodiments of the subject matter described herein relate to turbocharger systems that include one or more turbine stages having a multilayer sheet metal housing. As described in greater detail below in the context of FIGS. 2-8, in exemplary embodiments described herein, the turbine housing includes an inner sheet metal shell that defines at least a portion of the volute for a turbine wheel and an outer sheet metal shell that radially encloses the inner sheet metal shell while also enclosing the inner sheet metal shell in the axial direction opposite the turbine wheel. It should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

As described in greater detail below, the inner sheet metal shell includes a pair of sheet metal structures that face one another in the axial direction and are substantially circumferentially joined to one another in a radial plane to define the outer portion of the volute. The inner sheet metal shell includes a central opening for receiving a core structure that defines an axial outlet for the turbine. The core structure includes an inner voided region that receives and supports a nose of a turbine wheel that rotates in the radial plane within a central region that is radially circumscribed by the volute. At least a portion of the outer surface of the core structure faces an inner surface of the inner sheet metal shell and is contoured to define the inner portion of the volute opposite the outer portion of the volute defined by the contoured inner surface of the inner sheet metal shell. In other words, the core structure and the inner sheet metal shell cooperatively define the volute for the turbine that radially surrounds the turbine wheel.

The outer sheet metal shell includes a second pair of sheet metal structures that face one another in a direction aligned with the radial plane and are joined in an axial plane that is transverse to or otherwise intersects the radial plane in which the inner sheet metal shell is joined. In this regard, the inner and outer sheet metal shells provide a biaxial housing configuration for the volute of the turbine. In exemplary embodiments, the inner sheet metal structures are relatively thin to reduce the thermal inertia associated with the exhaust gas passageway while the outer sheet metal structures are thicker to provide added containment robustness. In some embodiments, the thickness of the outer sheet metal structure is at least twice the thickness of the inner sheet metal structure. Additionally, in exemplary embodiments, energy absorbing members (or dampers) are provided on inner surfaces of the outer shell sheet metal structures at locations susceptible to impact. In one or more embodiments, the total combined thickness of the inner sheet metal, the outer sheet metal, and the energy absorbing members is substantially equal to the thickness of a corresponding cast housing structure that would otherwise be utilized in lieu of the sheet metal shells. In some embodiments, the total combined thickness of the inner sheet metal, the outer sheet metal, and the energy absorbing members is greater than the thickness of a corresponding cast housing structure to provide equal or greater robustness as the cast component. In this regard, the energy absorbing members may allow for the thickness of the sheet metal shells at or near the inlet and/or the outlet of the turbine housing to have a combined thickness that is less than the cast component thickness while still achieving sufficient containment at or around the volute portion of the turbine housing.

In exemplary embodiments, the inlet of the sheet metal turbine housing defined by the inner and outer sheet metal shells is joined to a bypass valve assembly, which is realized as a cast metal. As described in greater detail below, the bypass valve assembly includes one or more guide portions or grooves adapted to receive the inlet portion of the outer sheet metal shell for joining the outer sheet metal shell to the bypass valve assembly in a manner that hermetically seals the outer sheet metal shell to the bypass valve assembly. In this regard, a feature of the bypass valve assembly encloses or otherwise circumscribes the end of the inlet portion of the outer sheet metal shell. The inlet portion of the inner sheet metal shell extends into the bypass valve assembly further than the end of the inlet portion of the outer sheet metal shell to minimize leakage but remains spaced apart from the bypass valve assembly by an air gap so that the inner sheet metal shell is floating or freestanding with respect to the bypass valve assembly. In other words, the inner sheet metal shell does not contact the bypass valve assembly and is spaced a distance apart from the bypass valve assembly by the air gap. While a bypass valve of the bypass valve assembly may be operated to reduce or prevent exhaust gas flow through the turbine and thereby mitigate the impact of the thermal inertia of the turbine housing, in exemplary embodiments described herein, the bypass valve is closed at low engine revolutions per minute (RPMs) to boost intake air. Thus, reducing the thermal inertia of the exhaust gas passageway decreases the amount of cooling of the exhaust gas attributable to the turbine housing, which in turn, helps to mitigate any potential impact of the turbine on downstream emissions control devices during startup conditions.

FIG. 1 depicts an exemplary embodiment of a two-stage turbocharger system 100 that includes a pair of turbocharger arrangements 110, 120, and may be designed for and utilized with any sort of vehicle, such as, for example, heavy-duty or performance automotive vehicles to light-duty automotive vehicles. A first turbocharger arrangement 110 includes a first compressor 112 having an inlet arranged to receive ambient air downstream of an air filter 102 for compression to provide charge air for the cylinders of the vehicle engine 106. The first turbine 114 is coaxially and concentrically aligned with the first compressor 112 and includes a turbine wheel mounted or otherwise coupled to the compressor wheel (or impeller) of the low pressure compressor 112 via a common rotary shaft 115. The first turbocharger arrangement 110 also includes a bypass arrangement 116 operable to selectively bypass the first turbine 114 and allow at least a portion of the exhaust gas to flow through a bypass valve associated with the bypass arrangement 116 to a downstream emissions arrangement 108 via ducting or another conduit without entering a volute for the turbine wheel. As described in greater detail below, in exemplary embodiments, the bypass arrangement 116 is realized as a cast metal structure that is joined or otherwise mounted to the housing of the turbine 114.

The second turbocharger arrangement 120 includes a second compressor 122 having an inlet arranged to receive charge air downstream of the first compressor 112 for further compression (e.g., supercharging) subject to operation of a bypass arrangement 128. In this regard, when the bypass arrangement 128 is open to bypass the second compressor 122, charge air from the first compressor 112 flows from the outlet of the first compressor 112 and through ducting or another conduit to an inlet of a charge air cooler 104 before provision to the engine intake or inlet manifold without entering a volute for the compressor wheel or without otherwise impacting the second compressor wheel. The second turbine 124 is coaxially and concentrically aligned with the second compressor 122 and includes a turbine wheel mounted or otherwise coupled to the compressor wheel of the compressor 122 via a common rotary shaft 125. The second turbocharger arrangement 120 also includes a bypass arrangement 126 operable to selectively bypass the second turbine 124 and allow at least a portion of the exhaust gas from the engine cylinders 106 to flow from the exhaust manifold(s) through a bypass valve associated with the bypass arrangement 126 to an inlet of the first turbine 114 via ducting or another conduit without entering a volute for the turbine wheel or otherwise impacting the turbine wheel.

By virtue of the so-called "series" configuration of the turbines 114, 124, the pressure of the input exhaust gases at the second turbine inlet is greater than the pressure of the exhaust gases at the first turbine inlet, and accordingly, the second turbine 124 may alternatively be referred to herein as the high-pressure (HP) turbine while the first turbine 114 may alternatively be referred to herein as the low-pressure (LP) turbine. Similarly, by virtue of the so-called "series" configuration of the compressors 112, 112, the pressure of the input exhaust gases at the second compressor inlet is greater than the pressure of the exhaust gases at the first turbine inlet, and accordingly, the second compressor 122 may alternatively be referred to herein as the high-pressure (HP) compressor while the first compressor 112 may alternatively be referred to herein as the low-pressure (LP) compressor.

In exemplary embodiments, the emissions arrangement 108 includes a catalytic converter or similar emissions control device having an efficacy that is influenced by the temperature of the exhaust gas at its inlet. Accordingly, it is desirable to minimize the thermal inertia associated with the turbocharger system 100 downstream of the exhaust manifold(s) of the engine 106 to facilitate a higher exhaust gas temperature at the inlet of the emissions arrangement 108. In the configuration depicted in FIG. 1, during startup conditions or at revolutions per minute (RPM) below a transition threshold, the low-pressure turbine bypass arrangement 116 is closed to achieve exhaust gas flow through the LP turbine 114 and corresponding operation of the LP compressor 112 to provide charge air to the engine 106. The transition threshold may be chosen as an RPM at which the likelihood of the LP turbine 114 becoming saturated or choked is greater than a LP turbine threshold percentage. Similarly, the HP bypass arrangements 126, 128 may also be closed to achieve exhaust gas flow through the HP turbocharger arrangement 120 until reaching a second transition threshold at which the likelihood of the HP turbine 124 becoming saturated or choked is greater than a HP turbine threshold percentage.

In exemplary embodiments, the HP turbine bypass arrangement 126 begins being regulated or opened at an initial transition threshold that is less than that of the LP turbine bypass arrangement 116 (e.g., 1500 RPM versus 4500 RPM), so that exhaust gas flow through the LP turbine 114 is more consistent and greater than that through the HP turbine 124 during operation of the turbocharger system 100. Thus, reducing the thermal inertia associated with the LP turbine 114 has a greater impact on the effectiveness of the emissions arrangement 108. Accordingly, as described in greater detail below, in exemplary embodiments described herein, the LP turbine 114 includes a multilayer sheet metal housing that defines at least a portion of the exhaust gas passageway through the LP turbine 114, and thereby reduces thermal inertia of the LP turbine 114.

Figure 4:
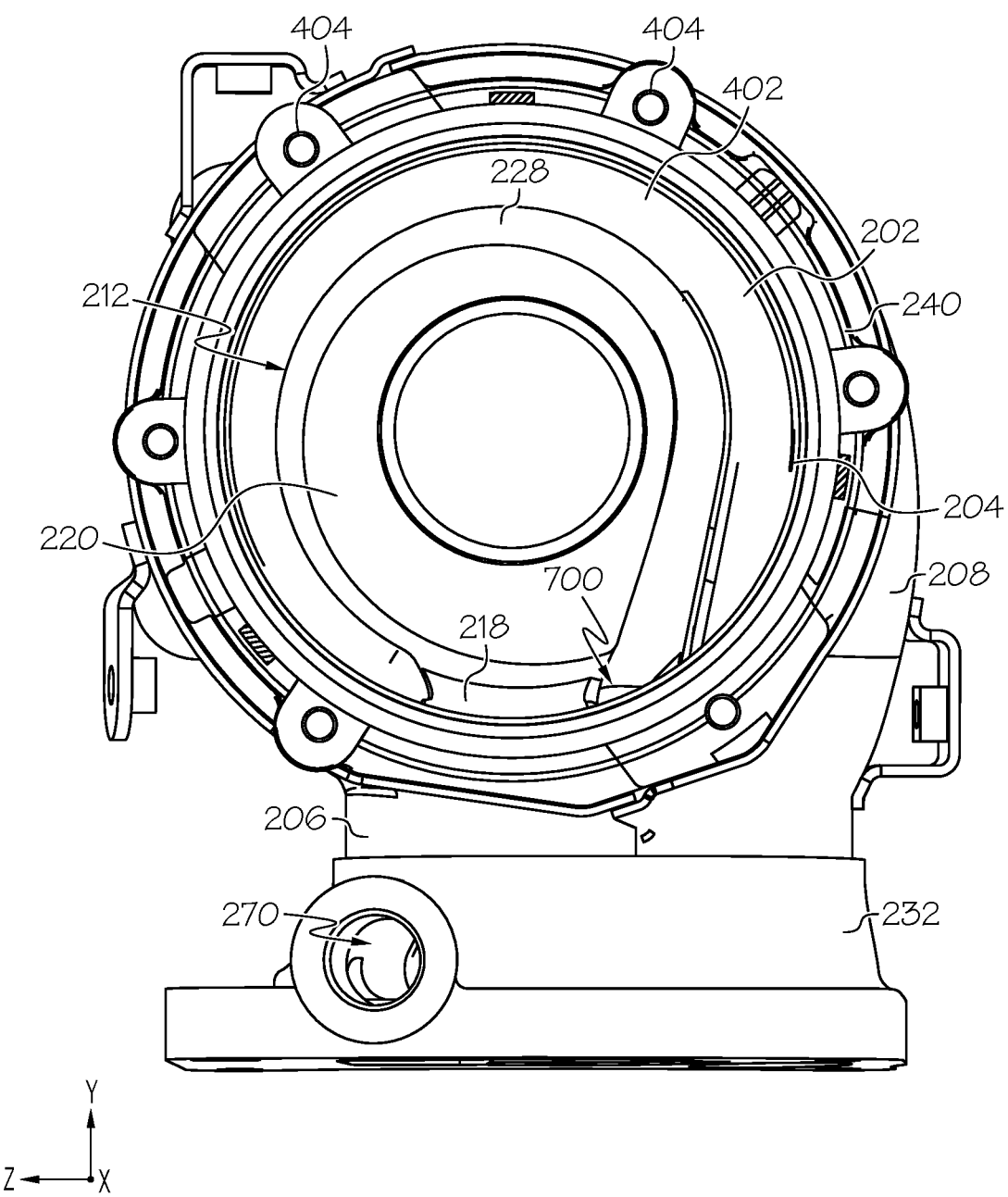
Figure 5:
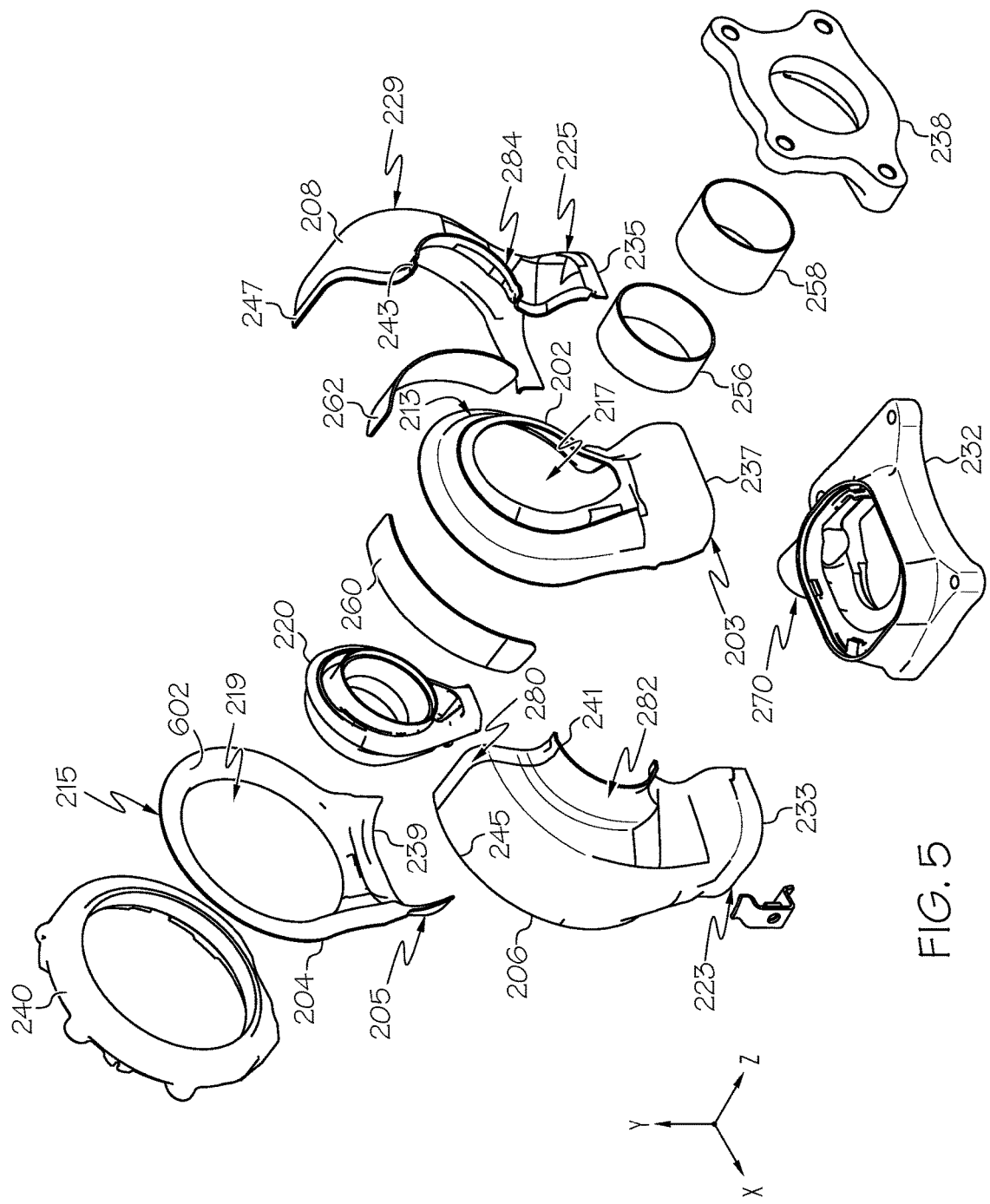
FIG. 5 is an exploded perspective view of the turbine arrangement of FIGS. 2-4.
Figure 6:
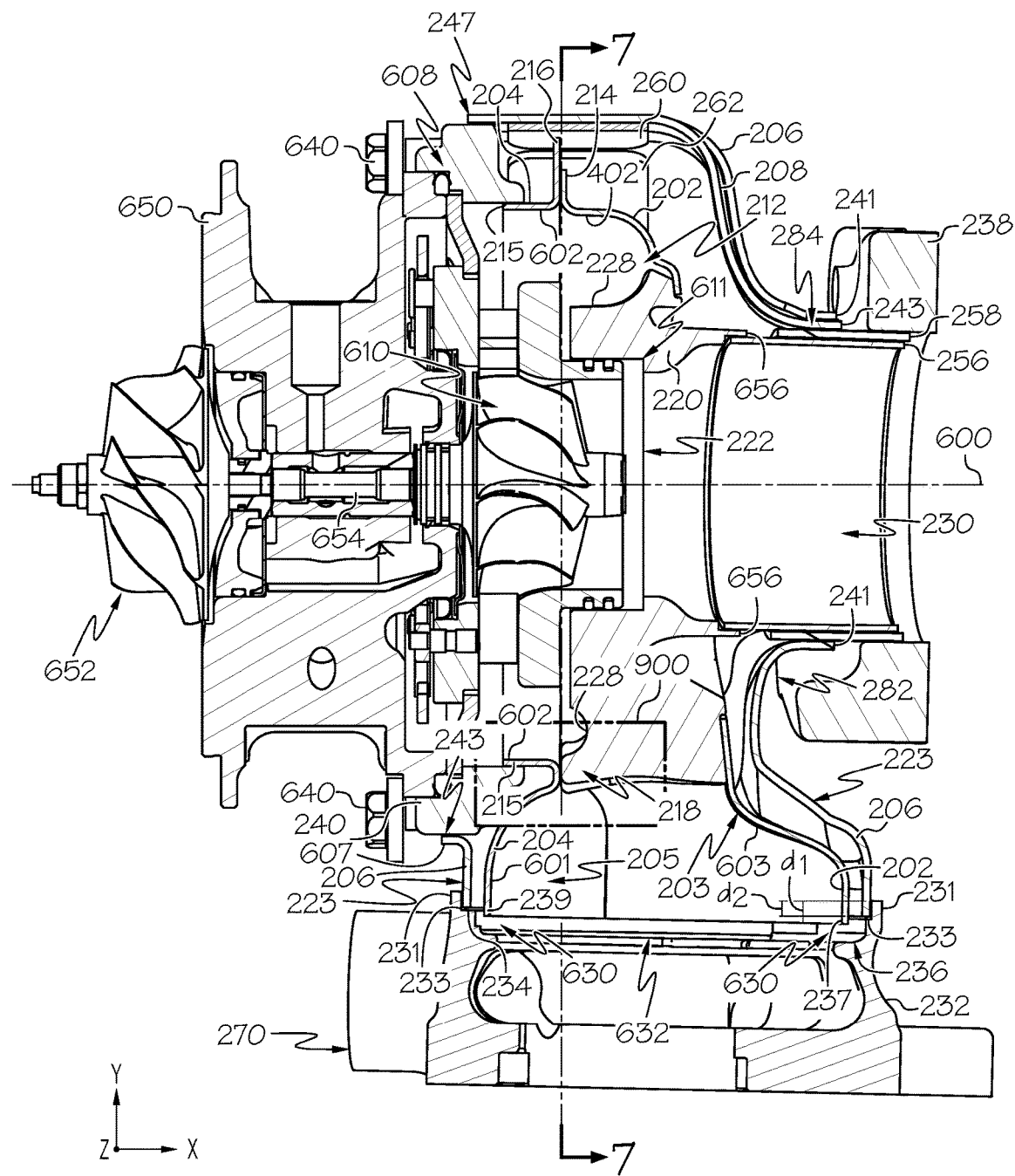
FIG. 6 is a cross-sectional view of the turbine arrangement of FIGS. 2-5, taken along line 6-6 in FIG. 3.

FIGS. 2-9 depict an exemplary embodiment of a turbine housing assembly 200 suitable for use in the turbocharger system 100 of FIG. 1, and in particular, with the LP turbine 114. In this regard, FIG. 6 depicts the turbine housing assembly 200 when a rotating assembly 650 including a turbine wheel 610 (e.g., turbine wheel) and a corresponding compressor wheel 652 (e.g., compressor wheel) is inserted into the turbine housing assembly 200 and joined or mounted with a flange 240.

With initial reference to FIGS. 2-7, the turbine housing assembly 200 includes a turbine housing defined by an inner sheet metal shell 202, 204, an outer sheet metal shell 206, 208, and a central core structure 220. The inner sheet metal shell 202, 204 includes a first sheet metal structure 202 that faces a second sheet metal structure 204 in an axial direction (the x reference direction) aligned with (or parallel to) the rotational axis 600 of the turbine wheel 610 such that the sheet metal structures 202, 204 interface and are joined in a radial plane that is aligned with (or parallel to) the plane in which the turbine wheel 610 rotates (the yz reference plane). For purposes of explanation, the inner sheet metal structure 202 closest to the turbine wheel 610 may alternatively be referred to herein as the proximal inner sheet metal structure and the inner sheet metal structure 204 farthest from the turbine wheel 610 may alternatively be referred to herein as the distal inner sheet metal structure. The outer sheet metal shell 206, 208 includes a first outer sheet metal structure 206 that faces a second outer sheet metal structure 208 in a direction substantially perpendicular to the rotational axis 600 of the turbine wheel 610 (e.g., in the z reference direction) such that the outer sheet metal structures 206, 208 interface and are joined in an axial plane that is aligned with (or parallel to) the rotational axis 600 of the turbine wheel 610 (the xy reference plane) and orthogonal to the plane in which the inner sheet metal structures 202, 204 are joined.

With reference to FIGS. 4-7, the inner sheet metal structures 202, 204 are formed to include respective base portions 203, 205 that cooperatively define a radial inlet 700 tangential to a volute 212. The volute 212 is a voided region providing a scroll-shaped exhaust gas passageway, and the volute 212 is defined by substantially circular portions 213, 215 that are integral with the base portions 203, 205 in concert with a core structure 220. In this regard, the interior surfaces 601, 603 of the base portions 203, 205 are contoured and configured in concert with a tongue 218 to direct exhaust gas tangentially into the volute 212 at the inlet 700 to the volute 212. The interior surfaces 402, 602 of the volute portions 213, 215 are contoured to define the outer contour of the scroll-shaped voided region of the volute 212 that narrows moving radially from the inlet 700 to the opposing end of the tongue 218 that separates the volute 212 from the inlet 700.

As best illustrated in FIGS. 5-6, each of the inner sheet metal structures 202, 204 includes a flange or similar feature 214, 216 that extends radially outward from the volute portions 213, 215 to provide an area for coupling the inner sheet metal structures 202, 204 circumferentially about the volute portions 213, 215. In the illustrated embodiment, the flange 216 of the proximal inner sheet metal structure 204 extends radially outward by a distance that is greater than or equal to the distance by which the flange 214 of the distal inner sheet metal structure 202 extends to facilitate welding the flange 214 of the distal inner sheet metal structure 202 to the flange 216 of the proximal inner sheet metal structure 204 substantially circumferentially about the volute portions 213, 215. In one example, the proximal inner sheet metal structure 204 and the distal inner sheet metal structure 202 are each composed of a ferritic stainless steel material (e.g., SUS430J1L) and are coupled together via by tungsten inert gas (TIG) welding.

As best illustrated in FIG. 5, each of the substantially circular volute portions 213, 215 of the inner sheet metal structures 202, 204 defines an interior opening 217, 219 that is substantially circular and coaxially and concentrically aligned with the rotational axis 600 of the turbine wheel 610 to receive a central core structure 220. The central core 220 includes an interior voided region 222 (or hole or bore) coaxially and concentrically aligned with the rotational axis 600 of the turbine wheel 610 that includes a substantially circular or counterbore portion 224 for receiving and engaging a nose 611 of the turbine wheel 610. The interior voided region 222 also includes a contoured portion 226 having a circumference that increases moving away from the turbine 610 along the axial direction (the x direction) aligned with the rotational axis of the turbine 610 to define an axial outlet for the turbine 610. Stated another way, a diameter of the contoured portion 226 varies along a length of the contoured portion 226, such that the diameter of the contoured portion 226 at a first end is different than the diameter of the contoured portion 226 at a second end. The distal end (or outlet end) of the core 220 includes a lip or similar feature 656 that receives an outlet pipe 256, as described in greater detail below.

Figure 7:
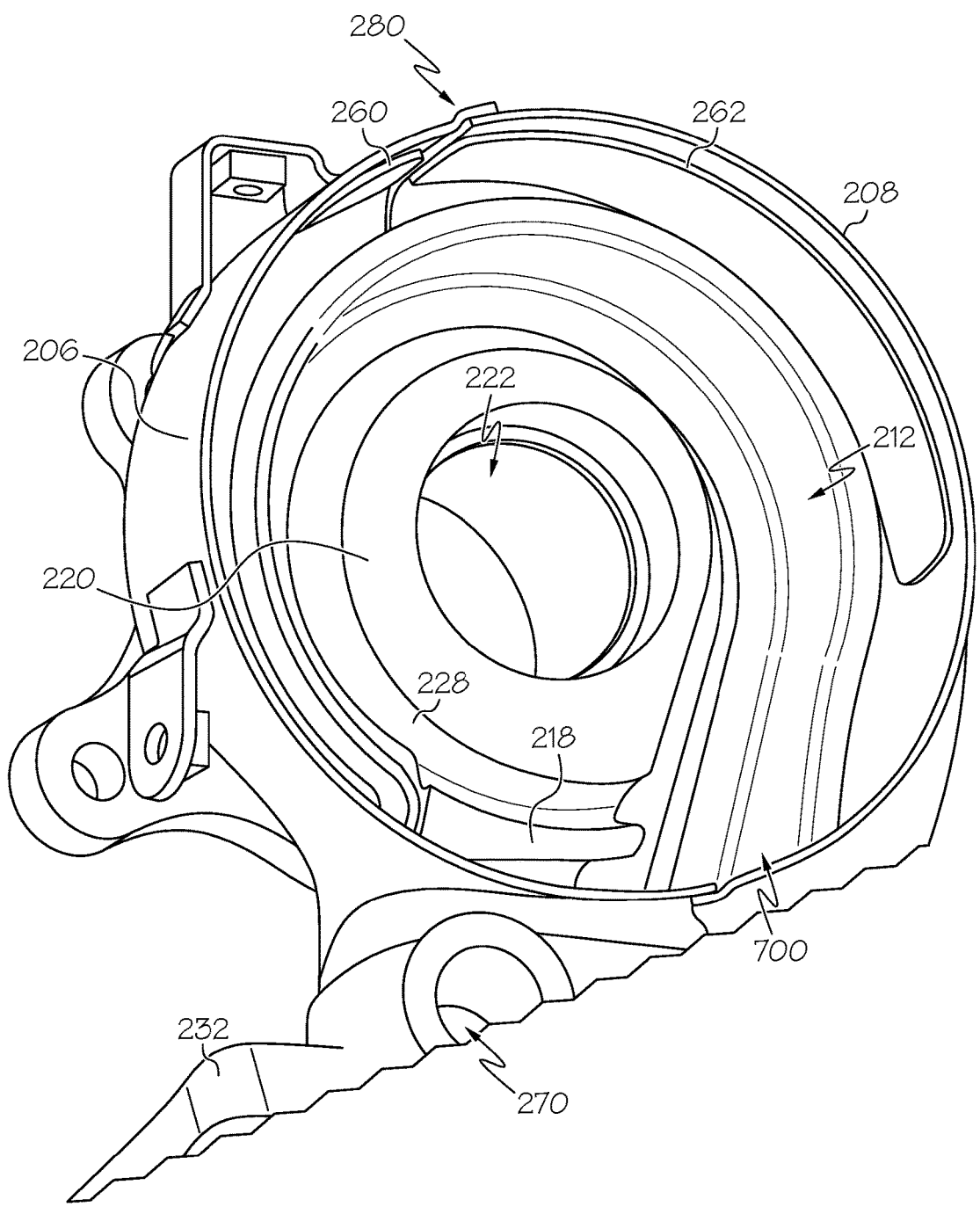
FIG. 7 is a partial cross-sectional view of the turbine arrangement of FIG. 6 taken along the line 7-7 in FIG. 6.

Referring to FIGS. 4 and 6-7, the central core 220 includes a tongue portion 218 that defines or otherwise separates the volute 212 from the tangential inlet thereto. As best illustrated in FIGS. 4 and 7, the central core 220 also includes a substantially continuous contoured outer surface 228 that faces the contoured inner surfaces 402, 602 of the volute portions 215, 217 of the inner sheet metal structures 202, 204 to define the inner contour of the voided region providing the scroll-shaped exhaust gas passageway for the volute 212. In exemplary embodiments, the central core structure 220 is realized as a unitary cast metal structure that is welded or otherwise affixed to the distal inner sheet metal structure 202, for example, by TIG welding about the opening 217 in the distal sheet metal structure 202, as described in greater detail below. In one example, the central core structure 220 is composed of cast ferritic stainless steel material (e.g., SUS430).

Figure 2:
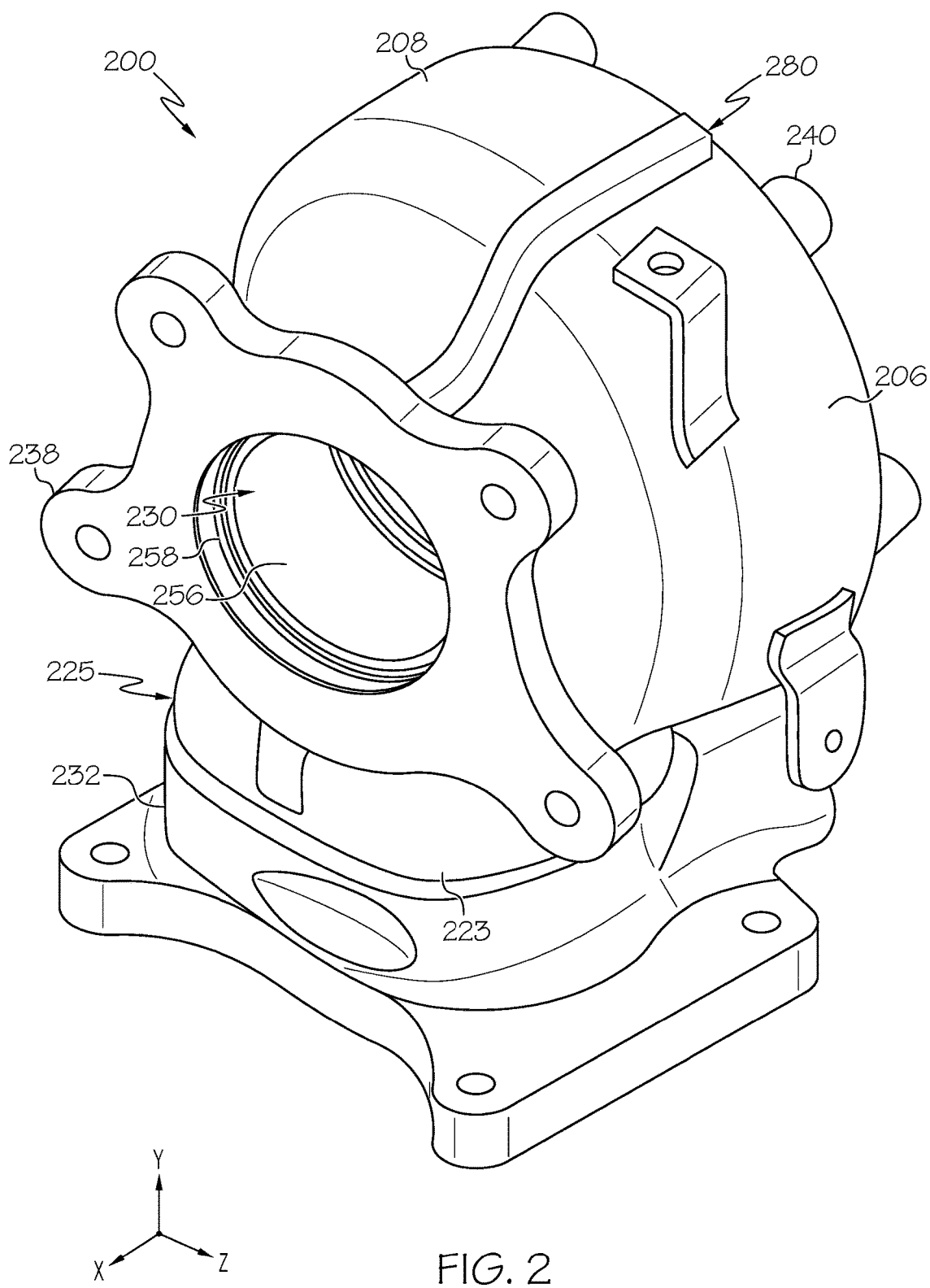
FIG. 2 is a perspective view of an exemplary turbine housing assembly suitable for use in the two-stage turbocharger system of FIG. 1 in one or more exemplary embodiments.
Figure 3:
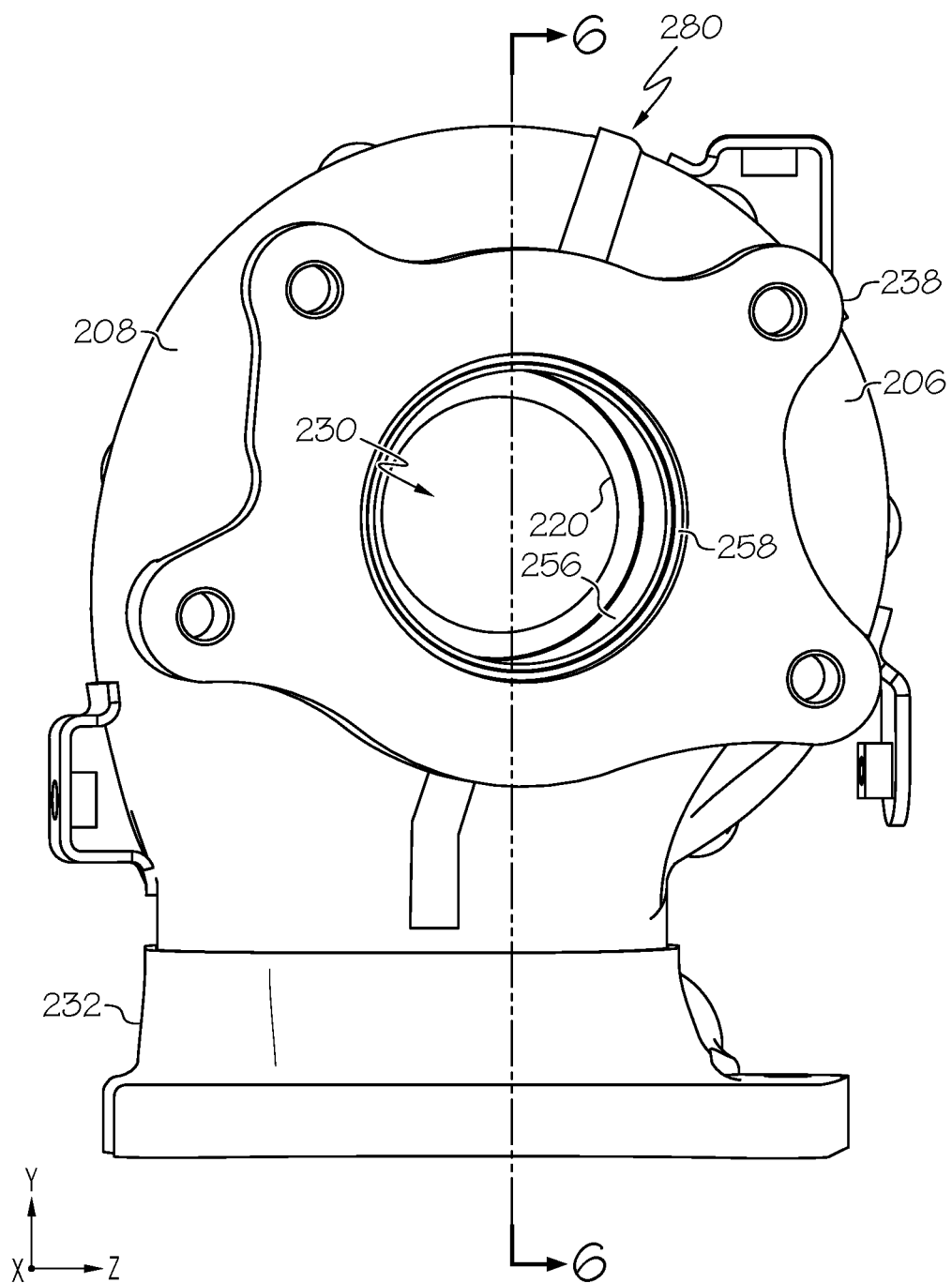
FIGS. 3-4 are plan views of the turbine housing assembly of FIG. 2.

With reference to FIG. 2-6, the outer sheet metal structures 206, 208 are formed to include respective base portions 223, 225 that cooperatively surround the inlet portions 203, 205 of the inner sheet metal structures 202, 204 in a plane (the xz reference plane) that is transverse or orthogonal to the radial plane (the yz reference plane) in which the turbine wheel 610 rotates. The outer sheet metal structures 206, 208 also include arcuate portions 227, 229 that cooperatively enclose or surround the volute portions 213, 215 of the inner sheet metal structures 202, 204 radially (e.g., in the yz reference plane). As best illustrated in FIGS. 2-3, in exemplary embodiments, one of the outer sheet metal structures 206 includes a receiving feature 280 formed therein which is configured to overlap and mate with the other of the outer sheet metal structures 208 about the interface between the outer sheet metal structures 206, 208 to facilitate joining the outer sheet metal structures 206, 208 to one another. In one example, the outer sheet metal structures 206, 208 are each composed of a ferritic stainless steel material (e.g., SUS409L) and are coupled together via by TIG welding. In this regard, the inner sheet metal shell 202, 204 and the outer sheet metal shell 206, 208 may be realized using different ferritic stainless steel materials.

Additionally, the outer sheet metal structures 206, 208 include contoured outlet portions 282, 284 that narrow moving away from the turbine wheel 610 in the axial direction (the x reference direction) to substantially enclose the inner sheet metal structures 202, 204 in the axial direction (the x reference direction) opposite the turbine wheel 610. As illustrated, the extension of the outer shell 206, 208 in the direction parallel to the turbine wheel rotational axis 600 away from the turbine wheel 610 defined by the contoured outlet portions 282, 284 is greater than the extension of the inner shell 202, 204 away from the turbine wheel 610 in the direction parallel to the turbine wheel rotational axis 600. At the same time, the extension of the inner shell 202, 204 substantially perpendicular to the turbine wheel rotational axis 600 as defined by the inner base portions 203, 205 is greater than the extension of the outer shell 206, 208 substantially perpendicular to the turbine wheel rotational axis 600 as defined by the outer base portions 223, 225.

The contoured outlet portions 282, 284 define a substantially circular interior opening 230 that is coaxially and concentrically aligned with the rotational axis of the turbine wheel 610, with the opening 230 also having a diameter that is less than the diameter of the circular interior openings 217, 219 defined by the inner sheet metal structures 202, 204. That said, it should be noted that depending on the embodiment, the axial outlet opening 230 defined by the outer sheet metal structures 206, 208 may be off-axis or angled relative to the rotational axis of the turbine 610, for example, due to packaging constraints or the like. The ends 241, 243 of the outer sheet metal structures 206, 208 defining the axial outlet opening 230 are coupled to a substantially-planar flange 238 via an outlet pipe 256 and collar 258 for coupling the turbine housing assembly 200 to a fluid conduit for carrying exhaust gas axially exiting the turbine wheel 610 to downstream emissions devices (e.g., a catalytic converter 108), as described in greater detail below.

Opposite the contoured outlet portions 282, 284 defining the axial outlet opening 230, each of the outer sheet metal structures 206, 208 includes a lip or similar receiving feature 607 defining at least a portion of a substantially circular opening 608 configured to receive a substantially circular flange 240 for mounting the turbine housing assembly 200 to the rotating assembly 650. The rotating assembly generally includes the turbine wheel 610 and the compressor wheel 652 coupled to the turbine wheel 610 via a common rotary shaft 654. As best illustrated in FIG. 6, in exemplary embodiments, the inner circumference of the opening 608 defined by the axial ends 245, 247 of the outer sheet metal structures 206, 208 proximal to the turbine 610 (or distal to the axial outlet) is greater than or equal to an outer circumference of the flange 240 such that a portion of the flange 240 is received within the opening 608. Thus, the outer sheet metal shell 206, 208 defines a bearing opening 608 having a radial dimension that is greater than that of the volute 212 while also defining an opposing outlet opening 230 having a radial dimension that is less than that of the bearing opening 608 and the volute 212. Generally, the bearing flange 240 includes a plurality of bores 404 distributed about a perimeter or circumference of the flange 240, which each receive a respective fastener 640. The fasteners 640 engage with the bores 404 to mount, support, or otherwise couple the flange 240, and thereby the turbine housing assembly 200, to the rotating assembly 650. It should be understood, however, that the flange 240 may be coupled to the rotating assembly 650 via any technique, such as an interference fit, welding, etc.

Figure 8:
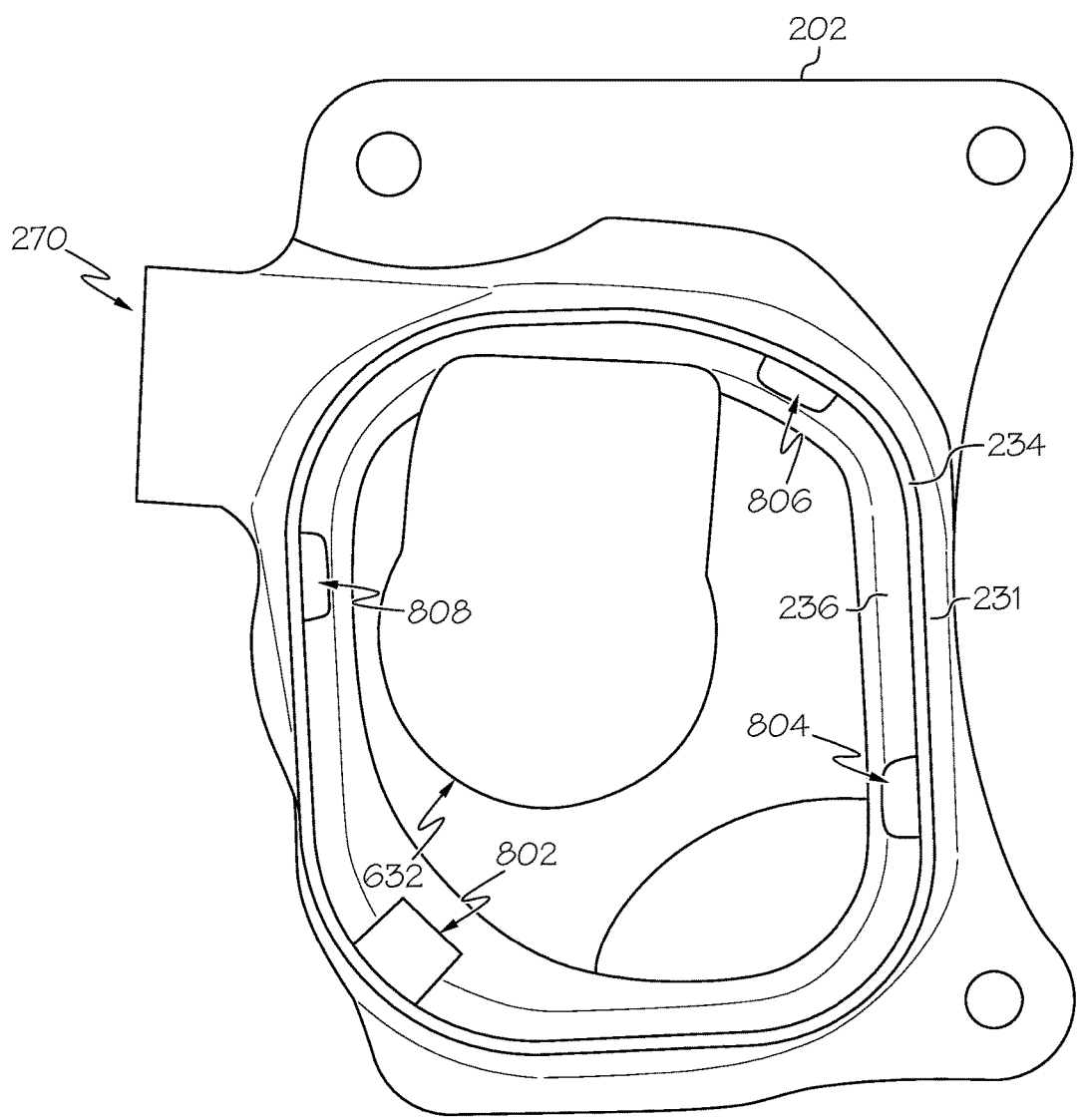
FIG. 8 depicts a top view of the bypass valve assembly structure in the turbine arrangement of FIGS. 2-6 in accordance with one or more exemplary embodiments.

Still referring to FIGS. 2-6, the ends 233, 235 of the base portions 223, 225 of the outer sheet metal structures 206, 208 are joined or otherwise coupled to a bypass valve assembly structure 232 that includes an opening 270 for a valve (e.g., bypass arrangement 116) that is operable to allow exhaust gas to selectively bypass the tangential inlet to the volute 212, and thereby bypass the turbine 610. In this regard, the bypass opening 270 extends along an axis that is oblique to the axis of the inlet opening 632, as illustrated in FIGS. 4, 6 and 8. In exemplary embodiments, the bypass valve assembly structure 232 is realized as a unitary cast metal material that includes a flange 231 (or lip) that receives and circumscribes the ends 233, 235 of the base portions 223, 225 of the outer sheet metal structures 206, 208 in the axial plane (the xz reference plane) transverse to the radial plane (the yz reference plane) in which the turbine wheel 610 rotates.

As best illustrated in FIGS. 6 and 8, the bypass valve assembly structure 232 also includes a corresponding guide portion 234 having an outer circumference that is less than or equal to an inner circumference of the lip feature 231 and an inner circumference that is less than or equal to an inner circumference of the ends 233, 235 of the combined outer sheet metal base 223, 225 for receiving and supporting the ends 233, 235 of the outer sheet metal base portions 223, 225. In this regard, the guide portion 234 may be realized as a shelf or surface about the perimeter of an inlet opening 632 in the bypass valve assembly structure 232 that includes one or more features 802, 804, 806, 808 that engage the ends 233, 235 of the outer sheet metal base portions 223, 225. The features 802, 804, 806, 808 may have distinct or different shapes and be spaced apart about the perimeter of the guide portion 234, and the features 802, 804, 806, 808 may be configured to mate with corresponding features on the base portions 223, 225 of the outer sheet metal structures 206, 208 when the outer sheet metal structures 206, 208 are inserted into the bypass valve assembly structure 232. The overlapping portion of the lip 231 is subsequently welded to the outer surfaces of the outer sheet metal base portions 223, 225 about its perimeter to hermetically seal the outer sheet metal structures 206, 208 to the bypass valve assembly structure 232.

Referring to FIG. 6, the bypass valve assembly structure 232 further includes an accommodation portion 236. The accommodation portion 236 may comprise a countersink defined in the inlet opening 632 of the bypass valve assembly structure 232. The accommodation portion 236 generally has an outer circumference that is less than or equal to an inner circumference of the ends 233, 235 of the combined outer sheet metal base 223, 225. The accommodation portion 236 is further recessed into the bypass valve assembly structure 232 relative to the guide portion 234 to accommodate extension of the inner sheet metal base portions 203, 205 into the bypass valve assembly structure 232 without contacting the bypass valve assembly structure 232. In this regard, the ends 237, 239 of the base portions 203, 205 of the inner sheet metal structures 202, 204 extend into the bypass valve assembly structure 232 (in the −y reference direction) by a distance ($d_1$) relative to the end of the lip feature 231 that is greater than the distance ($d_2$) that the outer sheet metal base ends 233, 235 extend beyond the end of the lip feature 231 into the bypass valve assembly structure 232 to minimize leakage between the inner and outer sheet metal shells. At the same time, an air gap or separation distance 630 is maintained between the ends 237, 239 of the inner sheet metal base portions 203, 205 and the accommodation portion 236 of the bypass valve assembly structure 232 so that the inner sheet metal base portions 203, 205 do not contact the bypass valve assembly structure 232 and are freestanding with respect to the bypass valve assembly structure 232.

As best illustrated in FIGS. 5-7, in exemplary embodiments, an energy absorbing member 260, 262 is provided on an interior surface of each of the outer sheet metal structures 206, 208. In one example, the energy absorbing members 260, 262 are disposed between the respective outer sheet metal structure 206, 208 and the inner sheet metal structures 202, 204. In this example, the energy absorbing members 260, 262 are arcuate sheet metal structures that substantially conform to the interior surface of the respective outer sheet metal structure 206, 208 and are welded (e.g., spot welding) to the interior surface of the respective outer sheet metal structure 206, 208 at locations that overlap portions of the outer sheet metal structures 206, 208. In this regard, by virtue of the shape of the outer sheet metal structures 206, 208, the upper portions of the outer sheet metal structures 206, 208 distal to the base portions 223, 225 where the outer sheet metal structures 206, 208 interface may be more susceptible to wheel burst. Accordingly, the energy absorbing members 260, 262 may be strategically placed to radially surround at least a portion of the volute 212 defined by the inner sheet metal structures 202, 204 adjacent to the location where the outer sheet metal structures 206, 208 are joined to provide additional radial containment.

In exemplary embodiments, the axial dimension (or width) of the energy absorbing members 260, 262 parallel to the turbine rotational axis 600 is configured to radially overlap portions the volute 212 for containment purposes, but without extending beyond the volute 212 in the axial direction to minimize the amount of material and weight contributed to the turbine housing assembly 200 by the energy absorbing members 260, 262. In this regard, the energy absorbing members 260, 262 and the volute 212 may be coplanar with the edges or ends of the energy absorbing members 260, 262 that are distal to the turbine 610 being substantially aligned with the distal extent of the volute 212 in the radial plane, as best illustrated in FIGS. 5-6. At the same time, the radial dimension (or length) of the energy absorbing members 260, 262 is also chosen to minimize the amount of material and weight contributed to the turbine housing assembly 200 by the energy absorbing members 260, 262 while strategically providing radial containment at the desired locations.

In one or more exemplary embodiments, the thickness of the outer sheet metal structures 206, 208 is greater than the thickness of the inner sheet metal structures 202, 204, that is, the outer sheet metal structures 206, 208 may be formed from a metal sheet having a thickness that is greater than the metal sheet used to form the inner sheet metal structures 202, 204. In this regard, the metal sheet used to form the inner sheet metal structures 202, 204 may be made as thin as practicable for thermal performance, with a thicker metal sheet being used for the outer sheet metal structures 206, 208 to obtain a resulting combined thickness that achieves the desired containment and reliability. For example, in one embodiment, the wall thickness of the volute portions 213, 215 of the inner sheet metal structures 202, 204 is approximately 1.2 millimeters (mm) and the wall thickness of the arcuate portions 227, 229 of the outer sheet metal structures 206, 208 is approximately 3 mm to provide a total thickness of about 4.2 mm, which corresponds to the wall thickness of a corresponding cast component of similar dimensions.

In one or more embodiments, the thickness of the energy absorbing members 260, 262 is chosen to achieve the casting thickness at the locations of the outer sheet metal structures 206, 208 most susceptible to loss of containment. For example, if the cast component thickness is 4.5 mm, and the inner sheet metal structures 202, 204 have a wall thickness of approximately 1.2 mm and the outer sheet metal structures 206, 208 have a wall thickness of approximately 3 mm, the thickness of the energy absorbing members 260, 262 may be chosen to be approximately 0.3 mm to achieve a combined thickness of 4.5 mm. In yet another embodiment, the same type of sheet metal is used for the outer sheet metal structures 206, 208 and the energy absorbing members 260, 262, and the thicknesses of the outer sheet metal structures 206, 208 and the energy absorbing members 260, 262 substantially identical and chosen to provide the cast component thickness. For example, if the cast component thickness is 4.5 mm and the inner sheet metal structures 202, 204 have a wall thickness of 1.3 mm, then both the outer sheet metal structures 206, 208 and the energy absorbing members 260, 262 may have a thickness of approximately 1.6 mm to achieve a combined thickness of 4.5 mm Thus, the thickness of the outer sheet metal structures 206, 208 and the energy absorbing members 260, 262 may be dictated by the thickness of the inner sheet metal structures 202, 204 and the required amount of containment, which, in turn, allows for the thickness of the inner sheet metal structures 202, 204 to be optimized to achieve the desired performance qualities.

Still referring to FIGS. 2-8, to fabricate the turbine housing assembly 200, the core structure 220 is inserted into the opening 217 of the distal inner sheet metal structure 202, and the distal inner sheet metal structure 202 is joined to the core structure 220 by tungsten inert gas (TIG) welding circumferentially about the opening 217 to an outer surface of the core structure 220 facing the axial outlet opposite the turbine wheel 610 to hermetically seal the distal sheet metal structure 202 to the core structure 220. The ends of the proximal inner sheet metal structure 204 that define the opening 219 for receiving the turbine wheel 610 are inserted into a corresponding opening defined by the flange 240 and joined circumferentially about the opening 219 by TIG welding to hermetically seal the sheet metal structure 204 to the flange 240. Thereafter, the inwardly facing ends of the inner sheet metal structures 202, 204 are joined to one another by TIG welding about the interface between the inner sheet metal structures 202, 204 in the radial plane to hermetically seal the inner sheet metal structures 202, 204 to one another in the axial direction. Thus, the volute portions 213, 215 are substantially circumferentially welded to one another at the portions where the rims 214, 216 meet to provide a hermetically sealed radial outer contour for the volute 212. The resulting welding seam or joint about the inner sheet metal structures 202, 204 resides in a radial plane (e.g., the yz reference plane) that is substantially parallel to the plane in which the turbine wheel 610 rotates and substantially perpendicular to the turbine wheel rotational axis 600.

Figure 9:
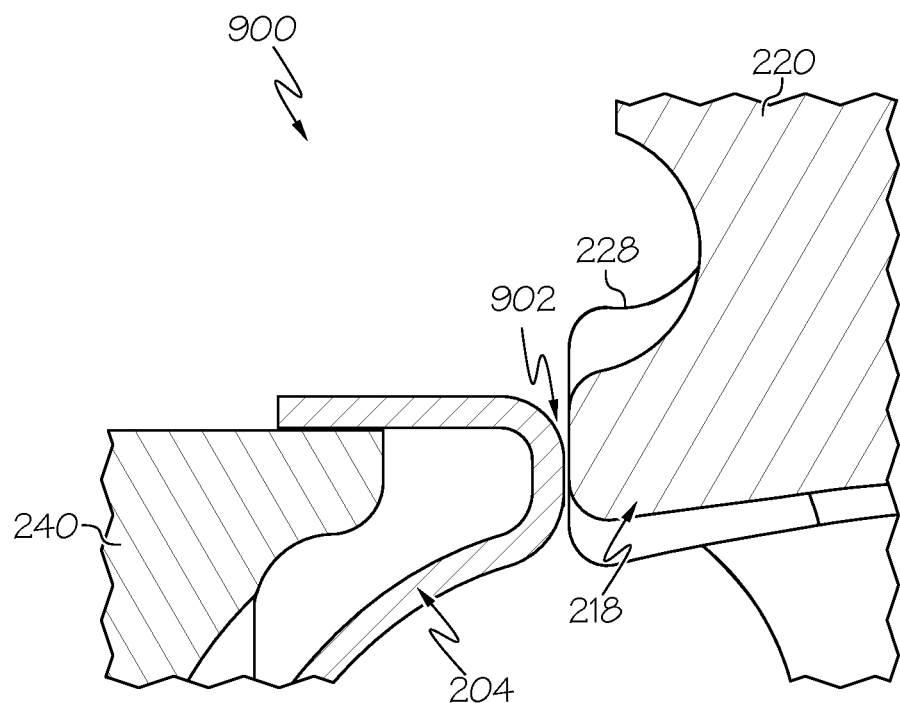
FIG. 9 is an enlarged cross-sectional view of a portion of the turbine arrangement of FIG. 6 in accordance with one or more embodiments.

As illustrated by the detailed view of region 900 in FIG. 9, in exemplary embodiments, the core structure 220 is not welded or joined to the proximal inner sheet metal structure 204, so that the core structure 220 is freestanding with respect to the proximal inner sheet metal structure 204. In particular, at ambient temperatures, the tongue portion 218 of the core structure 220 proximate the inlet is spaced apart from a corresponding tongue feature in the proximal inner sheet metal structure 204 separating the interior portion of the volute 212 from the inlet by an air gap 902 having a nonzero separation distance to accommodate thermal expansion of the inner sheet metal structure 204, and thereby reduce stress on the tongue portion 218 of the core structure 220. In this regard, the air gap 902 may be chosen to provide a separation distance at ambient temperatures that results in at least some separation distance being maintained at elevated exhaust gas temperatures during operation. In some embodiments, the inner sheet metal structure 204 may contact the tongue portion 218 of the core structure 220 during operation but only do so at or near its maximal thermal expansion, so that any stress imparted on the core structure 220 is minimized. For example, in one embodiment, the air gap 902 or separation distance between the tongue portion 218 and the corresponding tongue feature in the proximal inner sheet metal structure 204 is about 0.5 millimeters at ambient temperatures so that at a maximum operating temperature of 850° Celsius, the tongue portion 218 and the corresponding tongue feature in the proximal inner sheet metal structure 204 contact one another without causing any significant stress on either of the core structure 220 or the sheet metal structure 204.

After assembling the inner sheet metal structures 202, 204 with the core structure 220 and bearing flange 240, an axial outlet pipe 256 is inserted into a corresponding guide feature formed in the inner surface of the distal end of the outlet portion 226 of the core structure 220 and joined to the inner surface of the outlet portion 226 about the proximal end of the outlet pipe 256 by TIG welding, thereby hermetically sealing the axial outlet pipe 256 to the core structure 220. An outlet collar 258 is provided over the distal end of the outlet pipe 256.

Still referring to FIGS. 2-6, the energy absorbing members 260, 262 are joined to the inner surfaces of the respective outer sheet metal structures 206, 208 by spot welding. Thereafter, the upper portions of outer sheet metal structures 206, 208 opposite the base portions 223, 225 are joined about the assembled inner sheet metal structures 202, 204 by TIG welding the overlapping portions of the outer sheet metal structures 206, 208 together in the xy reference plane to radially enclose the volute portions 213, 215 in the yz reference plane. In this regard, a welding seam extends along the radius (or diameter) of the arcuate portions 227, 229 from the outlet ends 241, 243 of the outer sheet metal structures 206, 208 along the overlapping interface between the sheet metal structures 206, 208 (e.g., where the receiving feature 280 of structure 206 overlaps the end 243 of structure 208). The resulting welding seam or joint between the outer sheet metal structures 206, 208 resides in an axial plane that is substantially parallel to the turbine wheel rotational axis 600 and substantially perpendicular or transverse to the plane in which the turbine wheel 610 rotates, as best illustrated by FIGS. 2-3. In this regard, the plane the welding seam between the outer sheet metal structures 206, 208 resides in is substantially perpendicular or otherwise transverse to the radial plane in which the welding seam between the inner sheet metal structures 202, 204 resides, and the portion of the welding seam between arcuate portions 227, 229 opposite the inlet opening 632 and radially surrounding the volute 212 extends in an axial direction substantially parallel to a turbine wheel rotational axis 600.

Additionally, the distal ends 241, 243 of the outer sheet metal structures 206, 208 defining the axial outlet opening 230 are welded circumferentially about the outlet collar 258, which, in turn, supports the distal end of the outlet pipe 256 extending from the core structure 220 in the radial plane (the yz reference plane). In exemplary embodiments, the welding of the outlet pipe 256 to the outlet ends 241, 243 of the outer sheet metal structures 206, 208 and the welding of the upper portions of outer sheet metal structures 206, 208 are performed during the same welding process step.

The ends 233, 235 of the base portions 223, 225 are inserted into the guide portion 234 of the cast bypass valve structure 232. The base portions 223, 225 of the outer sheet metal structures 206, 208 are then joined in the xy reference plane by TIG welding the interface between the outer sheet metal structures 206, 208 from the outlet pipe 256 to the interface with the bypass valve assembly structure 232. The perimeter of the lip 231 of the guide portion 234 is also welded to the overlapped outer surfaces of the outer sheet metal structures 206, 208 in a plane substantially parallel to the turbine wheel rotational axis 600 (e.g., the xz reference plane) to hermetically seal the outer sheet metal structures 206, 208 to the bypass valve structure 232. Thus, the outer sheet metal structures 206, 208 and the bypass valve structure 232 cooperatively enclose the inner sheet metal structures 202, 204 radially, with the outer sheet metal structures 206, 208 and the bearing flange 240 enclosing the inner sheet metal structures 202, 204 axially. In exemplary embodiments, the welding of the lower portions of the outer sheet metal structures 206, 208 and the welding of the outer sheet metal base portions 223, 225 with the bypass valve assembly structure 232 are performed during the same welding process step. It should be noted that by virtue of the axial interface between the outer sheet metal structures 206, 208, the distance or amount of welding required to join the outer sheet metal structures 206, 208 is reduced as compared to welding circumferentially in a radial plane (e.g., a radial or diametric welding seam as compared to a circumferential welding seam).

As described above, the inlet ends of the base portions 237, 239 of the inner sheet metal structures 202, 204 extend further into the bypass valve structure 232 than the ends 233, 235 of the outer sheet metal base portions 223, 225 (e.g., into the recessed portion 236) to minimize any leakage at the inlet via the air gap between the ends of the inner base portions 237, 239 and the bypass valve structure 232 and into any gaps or spaces between the inner sheet metal structures 202, 204 and the outer sheet metal structures 206, 208. The separation distance between the inner base portions 237, 239 and the bypass valve structure 232 accommodates thermal expansion of the inner sheet metal structures 202, 204 resulting from the exhaust gas flow.

The outlet collar 258 is inserted into a corresponding opening in the exhaust outlet flange 238 and is circumferentially welded to the inner surface of the opening in the flange 238 to hermetically seal the exhaust gas passageway. In some embodiments, the axial outlet ends of the outlet pipe 256 and the outlet collar 258 are both welded circumferentially to the inner surface of the opening in the flange 238 concurrently to effectively weld all three structures 238, 256, 258 together and seal the outlet end of the exhaust gas passageway. In exemplary embodiments, the exhaust outlet flange 238 is formed from or otherwise realized using sheet metal. As illustrated in FIG. 2, in some embodiments, the outlet ends of the outer sheet metal structures 206, 208 defining the axial outlet opening 230 that receives the outlet pipe 256 and collar 258 may be spaced apart or otherwise offset from the outlet flange 238. Thus, the outlet pipe 256 and collar 258 may accommodate variations in the position or orientation of the flange 238 with respect to the outer sheet metal structures 206, 208 during manufacturing or assembly. That said, by virtue of circumferentially welding the outlet ends of the outer sheet metal structures 206, 208 to the collar 258, which, in turn is welded to the outlet pipe 256 and the outlet flange 238, the axial outlet exhaust gas passageway is hermetically sealed from the core structure 220 to the ducting downstream of the flange 238. In this regard, the outlet pipe 256 and collar 258 provide a hermetically sealed passageway when the axial outlet portion 226 of the core 220 is not welded or sealed to the outer sheet metal structures 206, 208.

After the turbine housing assembly 200 is fabricated, the turbine nose portion 211 of the assembly 250 is inserted into the corresponding portion 224 of the core structure 220, with the assembly 250 being mounted or otherwise joined to the turbine housing assembly 200 using the flange 240 in a manner that hermetically seals the flange 240 to the assembly 250. In exemplary embodiments, the turbine nose portion 211 includes one or more sealing rings circumscribing the outer surface of the turbine nose portion 211 to hermetically seal the axial outlet from the turbine wheel 610 with the opening 222 for the axial outlet provided within the core structure 220. Variable geometry members (e.g., guide vanes or the like) may be provided within the assembly 250 about the turbine wheel 610 and configured to regulate, control, or otherwise influence the exhaust gas flow from the volute 212 to the turbine wheel 610, as will be appreciated in the art.

By virtue of the inner sheet metal structures 202, 204 defining at least the outer contour of the volute 212 and the inlet thereto, the percentage of surface area encountered by the exhaust gas that is sheet metal is increased, which, in turn reduces the reduction in exhaust gas temperature at the opening in the exhaust outlet flange 238 relative to the exhaust gas temperature upon entry to the bypass valve structure 232. Additionally, the inner sheet metal structures 202, 204 are relatively thin, to further reduce the thermal inertia associated with the exhaust gas flow through the volute 212. Thus, the effectiveness of downstream emissions devices may be improved. The relatively thicker outer sheet metal structures 206, 208 provide containment for the volute 212 while also being constructed from sheet metal to reduce thermal inertia. At the same time, the bypass valve structure 232 is realized as a cast metal to support the remaining components of the turbine housing assembly 200 subject to any external loading caused by the ducting joined to the valved opening 270, ducting joined to the exhaust outlet flange 238, or the assembly 250 joined to the turbine housing assembly 200. The cast bypass valve structure 232 also helps maintain the opening 270 (e.g., by avoiding closure due to thermal expansion or deformation) and support robust and reliable operation of the bypass valve components (e.g., the valve, the arm or actuation element for the valve, and the bushings or other components that facilitate actuation) across a range of variable temperature and mass flow conditions and subject to potentially varying amounts of external loading. Additionally, the core structure 220 is realized as a cast metal to similarly provide robust and reliable operation across a range of variable temperature and mass flow conditions, namely, by providing a tongue portion 218 and other surfaces of the volute 212 that are less susceptible to deformation, thermal expansion, or the like. That said, by virtue of the volute portions 213, 215 and base inlet portions 203, 205 provided by the inner sheet metal structures 202, 204, the exposed surface area within the volute 212 and the inlet thereto that is realized as a cast metal may be reduced or otherwise minimized to achieve a corresponding reduction in the thermal inertia associated with the turbine housing assembly 200.

By virtue of the flanges 214, 216 about the radial interface between the inner sheet metal structures 202, 204, the area for the welding seam joining the inner sheet metal structures 202, 204 may be increased to facilitate a more consistent and stable weld about the circumferential interface of the volute portions 213, 215, and thereby may improve welding quality. Improved weld quality in concert with the radial seam orientation may result in improved stiffness for purposes of improved containment and may also help minimize volute deformation. Additionally, the welding seam direction for the weld joining the outer sheet metal structures 206, 208 minimizes the welding length (radially or diametrically versus circumferentially), which is advantageous for containment capability, which is further augmented by the increased thickness of the outer sheet metal structures 206, 208. The additional energy absorbing members 260, 262 radially overlapping the volute 212 further improve containment, with placement of the energy absorbing members 260, 262 proximate the joint between the outer sheet metal structures 206, 208 reinforcing relatively flatter sections of the outer sheet metal structures 206, 208 radially circumscribing the volute 212. At the same time, the axial and radial dimensions of the energy absorbing members 260, 262 may be minimized so that they only radially overlap the volute 212 at strategically advantageous locations to reduce material costs and weight.

As described above in the context of FIG. 1, at startup, the valve in the opening 270 is closed so that exhaust gas flows through the volute 212 and impacts the turbine wheel 610 before exiting the axial outlet 222, 230 to downstream emissions devices 108. By limiting the cast metal surface area encountered by the exhaust gas to the tongue 218 and contoured surface 228 of the core structure 220 and the outlet 222 of the core structure 220, the effective thermal inertia of the turbine housing assembly 200 relative to a corresponding cast turbine housing assembly is reduced. As a result, the exhaust gas that reaches the downstream emissions devices 108 has a higher temperature relative to a cast turbine housing assembly, and as a result, the performance of the downstream emissions device 108 is improved. At the same time, the sheet metal may also be utilized to minimize the size, weight, form factor, or the like associated with the turbine housing assembly 200 without compromising burst containment by virtue of the configuration described herein.

For the sake of brevity, conventional techniques related to turbines, compressors, turbochargers, wastegates, bypass valves, ducting, catalytic converters, emissions controls, and other functional aspects of the systems (and the individual operating components of the systems) may not be described in detail herein. Furthermore, the various figures contained herein are intended to represent exemplary functional relationships and/or physical couplings between the various elements. It should be noted that many alternative or additional functional relationships or physical connections may be present in an embodiment of the subject matter.

The foregoing description may refer to elements or components or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, the terms "first," "second," and other such numerical terms referring to structures do not imply a sequence or order unless clearly indicated by the context. Similarly, terms such as "upper", "lower", "top", and "bottom" refer to directions in the drawings to which reference is made.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A turbine housing assembly comprising:
   an inner shell comprising:
     an inner base portion defining an inlet; and
     a volute portion defining an outer contour of a volute in fluid communication with the inlet;
   an outer shell circumscribing the volute portion in a radial plane and including an outer base portion circumscribing the inner base portion, wherein:
     the inner shell comprises a first plurality of sheet metal structures joined to one another in the radial plane;
     the outer shell comprises a second plurality of sheet metal structures;
     first portions of the second plurality of sheet metal structures surrounding the volute portion are joined to one another in an axial plane transverse to the radial plane;
     a first extension of the inner base portion relative to a turbine wheel rotational axis is greater than a second extension of the outer base portion relative to the turbine wheel rotational axis; and
     a third extension of the outer shell along the turbine wheel rotational axis distal to a turbine wheel is greater than a fourth extension of the inner shell along the turbine wheel rotational axis distal to the turbine wheel.

2. The turbine housing assembly of claim 1, wherein:
   the first plurality of sheet metal structures are coupled about the volute portion; and
   second portions of the second plurality of sheet metal structures enclosing the volute portion in an axial direction are coupled diametrically.

3. The turbine housing assembly of claim 1, wherein the outer shell defines a bearing opening having a radial dimension greater than a radial dimension of the volute portion and an outlet opening in an axial direction opposite the bearing opening.

4. The turbine housing assembly of claim 3, wherein the outer shell encloses the inner shell in the axial direction opposite the bearing opening.

5. The turbine housing assembly of claim 1, wherein:
each of the first plurality of sheet metal structures includes a flange extending radially outward from the volute portion; and
the flanges of the first plurality of sheet metal structures are welded together.

6. The turbine housing assembly of claim 1, wherein each of the second plurality of sheet metal structures comprises an arcuate portion extending from a respective portion of the outer base portion.

7. The turbine housing assembly of claim 6, wherein an interface between the arcuate portions is welded in an axial direction substantially parallel to the turbine wheel rotational axis.

8. The turbine housing assembly of claim 1, wherein a thickness of the outer shell is greater than a thickness of the inner shell.

9. The turbine housing assembly of claim 1, wherein the inner shell and the outer shell are freestanding with respect to one another.

10. The turbine housing assembly of claim 1, wherein the first portions of the second plurality of sheet metal structures overlap in an axial direction aligned with the turbine wheel rotational axis.

11. A turbine housing assembly comprising:
an inner shell comprising a first plurality of sheet metal structures joined to one another at a first seam in a radial plane; and
an outer shell comprising a second plurality of sheet metal structures joined to one another at a second seam in an axial plane transverse to the radial plane, wherein:
the inner shell includes a volute portion defining an outer contour of a volute in the radial plane;
the outer shell substantially surrounds the volute portion and encloses the volute portion in an axial direction; and
an outer base portion of the outer shell circumscribes an inner base portion of the inner shell that defines an inlet in fluid communication with the volute;
a first extension of the inner base portion relative to a turbine wheel rotational axis is greater than a second extension of the outer base portion relative to the turbine wheel rotational axis; and
a third extension of the outer shell along the turbine wheel rotational axis distal to a turbine wheel is greater than a fourth extension of the inner shell along the turbine wheel rotational axis distal to the turbine wheel.

12. The turbine housing assembly of claim 11, wherein a thickness of the outer shell is greater than a thickness of the inner shell.

13. The turbine housing assembly of claim 11, wherein the volute portion of the first plurality of sheet metal structures is welded about at least a portion of a perimeter to provide the first seam.

14. The turbine housing assembly of claim 13, wherein portions of the second plurality of sheet metal structures are welded along at least a portion of a radius to provide the second seam.

15. The turbine housing assembly of claim 14, wherein the portions of the second plurality of sheet metal structures enclose the volute portion in the axial direction.

16. The turbine housing assembly of claim 11, wherein:
each of the first plurality of sheet metal structures includes a flange extending radially outward; and
the flanges of the first plurality of sheet metal structures are welded together about the volute portion.

17. The turbine housing assembly of claim 11, wherein the inner shell and the outer shell are freestanding with respect to one another.

18. A turbine housing assembly comprising:
an inner sheet metal shell comprising a first pair of sheet metal structures coupled together along a radial plane orthogonal to a turbine wheel rotational axis; and
an outer sheet metal shell comprising a second pair of sheet metal structures coupled together along a first plane transverse to the radial plane, wherein:
each of the first pair of sheet metal structures includes a volute portion defining an outer contour of a volute in the radial plane and a base portion defining an inlet in fluid communication with the volute;
each of the second pair of sheet metal structures includes an arcuate portion radially overlapping at least a portion of the volute portions in the radial plane and an outer base portion radially overlapping at least a portion of the base portions in a second plane transverse to the radial plane;
a first extension of the base portion of the first pair of sheet metal structures relative to a turbine wheel rotational axis is greater than a second extension of the outer base portion of the second pair of sheet metal structures relative to the turbine wheel rotational axis; and
a third extension of the outer sheet metal shell along the turbine wheel rotational axis distal to a turbine wheel is greater than a fourth extension of the inner sheet metal shell along the turbine wheel rotational axis distal to the turbine wheel.

19. The turbine housing assembly of claim 18, wherein:
each of the first pair of sheet metal structures includes a flange extending radially outward about the volute portion;
the flanges of the first pair of sheet metal structures are coupled together circumferentially about the volute portion;
overlapping portions of the arcuate portions are coupled together in an axial direction aligned with the turbine wheel rotational axis to surround the volute portions; and
each of the second pair of sheet metal structures includes a tapered outlet portion coupled to the other to enclose the volute portion in the axial direction.

* * * * *